United States Patent
Stone

[15] 3,663,253
[45] May 16, 1972

[54] DETERRENT COMPOSITIONS

[72] Inventor: Rufus John Stone, 19 Brunsall Street, London, S.W. 3, England

[22] Filed: Oct. 8, 1969

[21] Appl. No.: 864,890

Related U.S. Application Data

[63] Continuation-in-part of Ser. No. 759,216, Sept. 11, 1968, abandoned.

[30] Foreign Application Priority Data

Oct. 15, 1968 Great Britain......................48,720/68

[52] U.S. Cl................................106/204, 106/146, 106/148, 106/205, 106/208, 106/213, 106/214, 260/29.6 B, 260/29.6 MN, 260/29.6 N, 260/29.6 MM, 424/154, 424/195
[51] Int. Cl. ......................................................C08b 25/00
[58] Field of Search..................424/300, 195; 106/205, 209, 106/204; 260/29.6

[56] References Cited

UNITED STATES PATENTS

| | | | |
|---|---|---|---|
| 2,786,774 | 3/1957 | Seeley | 106/162 |
| 2,174,541 | 11/1939 | Walthausen | 260/234 |
| 1,270,630 | 6/1918 | Lerst | 424/154 |

*Primary Examiner*—Theodore Morris
*Attorney*—Holman & Stern

[57] ABSTRACT

An animal deterrent composition comprising a major proportion of a finely divided animal deterrent compound of aluminum together with a minor proportion of one or more of certain specified organic animal deterrent compounds. The invention also consists in a method of deterring animals using the composition of the invention.

14 Claims, No Drawings

DETERRENT COMPOSITIONS

This application is a continuation-in-part of my application Ser. No. 759,216 filed Sept. 11, 1968, now abandoned.

This invention is concerned with improvements in or relating to compositions to inhibit animals from chewing, biting, eating, pecking, sucking, boring into, or otherwise attacking with the mouth objects to which the compositions have previously been applied. Such compositions will, hereinafter, be referred to as "animal deterrent compositions."

It is known that certain compounds have the effect of inhibiting animals from chewing, biting, pecking, sucking, eating or boring into objects to which the compounds have been applied. Examples of such compounds include aluminum compounds such as as potassium aluminum sulphate, also known alum, aluminum sulfate and, particularly, aluminum ammonium sulfate and organic compounds such as sucrose octa-acetate, benzyldiethyl (2,6 xylylcarbamoyl methyl) ammonium benzoate, 9,10-dioxoanthracene, dimethylphthalate, N,N-diethyl-m-toluamide, butopyronoxyl, meliantriol, crude extracts of parts of the plants *melia azedarach* L. and *melia azadirachta* L. and margosa oil. It is believed that the animal deterrent effect of these compounds may be due to their unpleasant taste, and possibly in some measure to their unpleasant smell.

In the past the use of these compounds has been limited because of their unreliability when used on certain classes of animals or under certain environmental conditions. Thus, it may well happen that when the same compound is used as an animal deterrent for the same group of animals on two successive occasions the compound may be effective on the first occasion but not on the second or vice versa. In other words, the effects of the compounds are not always reproducible on every class of animal under all conditions. It may be effective only to comparatively few species of animals, or it may not be effective to animals of the same class but from different environments.

I have now found that compositions containing an animal deterrent compound of aluminum, such as aluminum ammonium sulfate, together with one or more of the following — Sucrose octa-acetate, benzyldiethyl (2,6-xylylcarbamoyl methyl) ammonium benzoate, 9,10-dioxoanthracene, dimethylphthalate, N,N-diethyl-m-toluamide, butopyronoxyl, meliantriol, crude extracts of parts of the plants *melia azedarach* L., and *melia azadirachta* L., and margosa oil, are particularly effective over a wider field of use both as regards class of animal and their environment. Thus, such compositions have a much more reliable and wider range of effect in that they give reproducible results over a greater number of classes of animals and in a wider variety of environment and, further, the compositions have a very much greater degree of activity than would be expected if the compositions were acting as mere mixtures, i.e. there appears to be synergism between two or more of the active components of the composition.

According to the invention, therefore, there is provided an animal deterrent composition containing as animal deterrent component an animal deterrent compound of aluminum (suitably one containing aluminum and sulfate ions, and preferably aluminum ammonium sulfate) together with at least one other animal deterrent compound selected from sucrose octa-acetate, benzyldiethyl (2,6 xylylcarbamoyl methyl) ammonium benzoate (which is preferred); 9 10-dioxoanthracene; methylphthalate; N.N.diethyl-m-toluamide; butopyrenoxyl; meliantriol; crude extracts of parts (especially crushed and ground fruit) of the plants *melia azedarach* L. and *melia azadirachta* L., and margosa oil.

In accordance with a preferred feature of the invention the composition contains sucrose octa-acetate together with another animal deterrent compound.

The animal deterrent compound of aluminum is preferably in finely divided form, although it may be found effective in certain classes of animals and environment and in certain of the formulations of larger particle sizes, nevertheless, suitably all of the aluminum compound has a particle size less than 75 microns, advantageously less than 10 microns. Desirably the other ingredients will also be in finely divided form, for example having a particle size range similar to that of the aluminum compound. The ratio of aluminum compound to the other ingredients may vary within wide limits. Preferably, however, the aluminum compound is present in greater amount by weight than the total of the other ingredients; for example, each of the other constituents may form from 0.005 – 25 per cent (suitably up to 25 per cent ) by weight depending upon the nature of the use of the composition, but under normal circumstances the total weight of the active constituents or constituent other than the aluminum compound will preferably not be greater than 30 per cent and advantageously not more than 10 per cent, but they may for certain compositions, be greater than that amount.

The compositions according to the invention may, of course, contain diluents and/or carriers and the nature of these will depend upon the exact nature of the desired final composition. In this connection, it should be noted that where the active components of the compositions according to the invention are non-toxic, non-phytotoxic, odorless and non-staining, then in order to provide a composition having similar properties it will be necessary to employ such diluents and/or carriers such as are themselves non-toxic, non-phytotoxic, odorless and non-staining. If however, some degree of toxicity, phytotoxicity, odor or staining may be tolerated, toxic, phytotoxic or odoriferous or staining carriers and/or diluents may be employed. In general, however, it is preferred that the carriers and/or diluents employed in compositions of this invention should be non-toxic, non-phytotoxic, odorless and non-staining so that they may have as wide an application as possible.

In particular, three forms of formulation are contemplated in the present invention, namely a powder formulation and a paste formulation for solution or suspension in water or for direct application and a so-called "aerosol" or pressurized formulation.

In the powder and paste formulations the proportion of the sucrose octa-acetate (if present) should be kept as low as possible, for example, less than 25 percent by weight of the composition, in order to avoid any danger of the composition gelling on the addition of water. The composition may contain, for example, building or bulking agents such as corn starch, carob flour, dextrin, lactose guar gum, carragheenin, alginates and the like. The powder formulation may also suitably contain a wetting agent to facilitate the dispersion and/or solution of the composition in water. The wetting agent may be, for example, anionic or non-ionic in character. Examples of suitable wetting agents include soaps such as alkali metal salts of fatty acids, for example, salts of fatty sulfates such as sodium lauryl sulfate, salts of long-chain alkyl benzene sulfonates and partial fatty acid esters of sorbitan and sorbitol.

The powder compositions may also contain agents to improve the flow of the powder such as finely divided silicon dioxide, for example those sold under the trade names "Silica Gel," "Neosyl" or "Acrocil."

The paste formulations contain a coating composition or binding agent such as a paint lacquer, varnish, an emulsion or a solution of a synthetic organic polymer or other suitable ingredients which will adhere to the article, plant or animal to which the composition is to be applied, and to remain adherent to the article for a more or less extended period of time. The compositions according to the invention may take many forms. Thus, they may take the form of conventional oil-bound paints or water-bound paints or distempers, so-called "emulsion" paints, synthetic polymeric paints such as polyurethane paints, emulsions of film-forming polymers, and particularly, plasticized emulsions of polyvinyl chloride.

The pressurized formulations of the compositions according to the invention will generally comprise the active ingredients suspended in conventional liquified gaseous propellants such as trichlorofluoromethane and dichlorodifluoromethane. The compositions will generally also contain one or more of the wetting agents acting as suspending agents to maintain the active ingredients in suspension, such as the wetting agents referred to above. It may, however, be desirable to include in the container for the pressurized compositions agitating means so that the container may be shaken to ensure complete dispersion of the active ingredients within the composition. The pressurized compositions may also contain builders and the like as described above with reference to the powder formulation.

The compositions according to the invention find a wide range of application in horticulture, agriculture, viticulture, the growing of fruit, tea and cereals of all kinds, and forestry as well as in domestic use. Thus, the compositions according to the invention may be used in horticulture and agriculture to protect growing plants against the depredations of animals, for example, they may be used to protect fruit and the like against attack from birds and insects.

The compositions according to the invention may also be used to protect plants, human beings and animals from the blood-sucking action of leeches and from attacks by many kinds of insects.

In the field of animal husbandry the compositions are of great use in preventing animals from damaging themselves or other animals. For example, they may be used to prevent tail-biting in pigs, naval sucking amongst calves, feather-pecking and cannibalism in poultry, fur-chewing among fur-bearing animals such as rabbits and chinchillas, and to deter horses from chewing or biting any woodwork surrounding them.

In forestry the compositions may be applied to trees to prevent de-barking and defoliation by rabbits and other animals and pests. In the home the compositions also serve to protect articles from wild animals or domestic pets. Thus the compositions may be used to inhibit the attacks of rats upon refuse bags.

The composition of the invention may be applied at varying dosage rates but in the case of dry powder compositions they are conveniently applied at a rate of from 10 to 30 pounds of active ingredient, preferably about 20 pounds of active ingredient, per acre. If the powders are dissolved in water they may suitably be applied at rates of from 10 to 30 pounds per acre, suitably 16 to 25 gallons per acre of a 1:10 solution. Where the compositions are in the form of emulsions with adhesive agents they may be used at a slightly higher rate; e.g. up to 50 lbs. per acre.

In order that the invention may be well understood examples of compositions according to the invention will now be given by way of illustration only. In the Examples all percentages are by weight unless otherwise stated and all active ingredients are in the form of fine powders having particle sizes of less than 10 microns.

The various powder compositions may comprise the following:

EXAMPLE 1.

| | |
|---|---|
| Aluminum ammonium sulfate | 90% |
| Sucrose octa-acetate | 2.0% |
| 9,10-dioxoanthracene | 2.0% |
| Benzyldiethyl (2,6 xylylcarbamoyl methyl) ammonium benzoate | 0.5% |
| Dimethylphthalate | 0.5% |
| N,N-dimethyl-m-toluamide | 0.5% |
| Butopyronoxyl | 0.5% |
| Margosa oil | 0.5% |
| Sodium lauryl sulfate | 0.5% |
| Silica Gel | 0.5% |
| Lactic casein | 2.5% |

This composition may be used to deter chewing, biting, pecking and sucking by all kinds of animals, including mammals, birds, leeches, locusts and other insects.

EXAMPLE 2.

| | |
|---|---|
| Aluminum ammonium sulfate | 92.5% |
| Benzyldiethyl (2,6-xylylcarbamoyl methyl) ammonium benzoate | 0.5% |
| Sodium lauryl sulfate | 0.5% |
| Silica Gel | 0.5% |
| Lactic casein | 5.0% |

This composition may be used to deter many classes of mammals and birds from chewing, biting and pecking anything to which it has been applied.

EXAMPLE 3.

| | |
|---|---|
| Aluminum ammonium sulfate | 93.0% |
| Sucrose octa-acetate | 2.0% |
| Benzyldiethyl (2,6-xylylcarbamoyl methyl)ammonium benzoate | 0.5% |
| Margosa oil | 0.5% |
| Butopyronoxyl | 0.5% |
| Sodium lauryl sulfate | 0.5% |
| Silica Gel | 0.5% |
| Lactic casein | 2.5% |

This composition may be used to deter locusts and insects with similar tastes from chewing anything to which it has been applied, in addition to the deterrent effects contained in Example 2 above.

EXAMPLE 4.

| | |
|---|---|
| Aluminum ammonium sulfate | 93.0% |
| Sucrose octa-acetate | 2.0% |
| 9,10-dioxcanthracene | 2.0% |
| Benzyldiethyl (2,6-xyiylcarbamoyl methyl)ammonium benzoate | 0.5% |
| Dimethylphthalate | 0.5% |
| Dimethyltoluamide | 0.5% |
| Sodium lauryl sulfate | 0.5% |
| Silica Gel | 0.5% |
| Lactic casein | 0.5% |

This composition may be used to repel many classes of insects all over the world, as well as many classes of mammals and birds.

An animal deterrent paste composition comprises:

EXAMPLE 5.

| | |
|---|---|
| Aluminum ammonium sulfate | 91.5% |
| Sucrose octa-acetate | 2.0% |
| Benzyldiethyl (2,6-xylylcarbamoyl methyl)ammonium benzoate | 0.5% |
| 9,10-dioxoanthracene | 0.5% |
| Sodium lauryl sulfate | 0.5% |
| Silica Gel | 0.5% |
| Polyvinyl chloride emulsion comprised of: | 4.5% |
| polyvinyl chloride | 45.3% |
| vinyl chloride | 0.50% |
| dibutyl phthalate | 16.53% |
| diallyl ricinoleate | 0.02% |
| polyvinyl alcohol | 1.65% |
| deionized water | 36.0 % |

EXAMPLE 6.

A repellent composition was made up comprising:

| | |
|---|---|
| Aluminum Ammonium Sulfate | 97.995% |
| Sucrose Octa-Acetate | 2.000% |
| Benzyldiethyl (2,6-xylylcarbamoyl methyl)ammonium benzoate | 0.005% |

This composition was mixed with a mixture of equal parts of partially hydrolysed polyvinyl acetate and fully hydrolysed polyvinyl acetate in a ratio of 95 parts of repellent composition and 5 parts of polyvinyl acetate. The resultant powder composition will hereinafter be referred to as "Powder" and a solution of 1 part of 10 in 10 parts of water will be referred to as "Powder Solution."

Further, the repellent composition was mixed with a hydrolysed polyvinyl acetate emulsion in the ratio of 95 parts of repellent composition to 5 parts of emulsion. The resultant composition will hereinafter be referred to as "M.T.Emulsion" and a solution of 1 part of "M.T.Emulsion" in 4 parts of water will be referred to as "M.T.Emulsion Solution."

An aerosol composition was prepared comprising 9 percent of the repellent composition, 1 percent of mineral oil and 90 percent of an equal mixture of Arcton 11 and Arcton 12. This composition will hereinafter be referred to as "Aerosol."

The "Powder," "Powder Solution," "M.T.Emulsion," "M.T.Emulsion Solution" and "Aerosol" were tested for repellent activity on crops, against tail biting in pigs and for the protection of stored grain, against rats. The results of these tests are summarized in the following tables.

There are many possible deterrent compositions deriving from the permutation of the ingredients named above. The component common to all of the compositions is an aluminum compound, preferably aluminum ammonium sulfate, which may be mixed with any one or all of any combination of the other active ingredients mentioned above, in widely varying quantities, together with such stabilizing, wetting, emulsifying and adhesive agents as may be required for the particular use of the deterrent.

The cause of the synergism between the active ingredients has not yet been satisfactorily proved, but it is thought that this arises from the use of the powdered aluminum compound, for although each ingredient is known to have deterrent properties of some kind, the effects of their admixture, either separately or together, in varying ratios with the aluminum compound are increased deterrent action of a wider class of animal and a wider range of environmental area with greater persistence and a more prolonged life compared with the sum of the effects of the ingredients used separately or together without an aluminum compound.

TABLE I.—TESTS AS ANIMAL AND BIRD DETERRENT ON CROPS

| Crop, acres | Damage | Curb applied | Percent losses, estimated ||| Control, percent | Remarks |
|---|---|---|---|---|---|---|---|
| | | | In previous years, percent | After spray, percent | | | |
| Fruit: | | | | | | | |
| Pears, 10 acres | Bullfinches disbudding | 20 gal. per acre M.T. emulsion solution | 85–90 | 3–5 | | 70 | 1 spray overall January, 1 spray headlands February. |
| Pears, 40 | do | do | 65–80 | 5 | | 90 | 1st spray on pears January, then 2d spray on apples when pear control all eaten. |
| Apples, 60 | do | do | 30–50 | 1 | | 50 | |
| Plums, 10 | do | 30 g.p.a. M.T. emulsion solution | 75–90 | 12 | | 80 | 1st spray overall December, 2d spray headlands, mid February. |
| Gooseberries, 3 acres | do | 20 g.p.a. M.T. emulsion solution | 50–80 | 5 | | 60 | 1 spray January, other food available nearby. |
| Black currants, 2½ acres | do | do | 50–75 | 7 | | 80 | 1 spray February after attack started. |
| Cherries, 5 acres | do | 25 g.p.a. powder solution | 75–90 | 15 | | 95 | 1 spray before attack started. |
| Pears, 10 acres | do | do | 15–25 | 1 | | 15 | 1 spray after attacks on unripe fruit. |
| Apples, 15 acres | do | 20 g.p.a. powder solution | 10–20 | 2 | | 17 | 1 spray on unripe fruit after attack started. |
| Strawberries, 5 acres | do | do | 5–15 | 0 | | 10 | 1 spray on unripe fruit. |
| Table grapes, 2 acres | do | do | 10–25 | 1 | | 20 | 1 spray on unripe fruit before attack started. |

TABLE I.—TESTS AS ANIMAL AND BIRD DETERRENT ON CROPS—Continued

| Crop, acres | Damage | Curb applied | Percent losses, estimated ||| Remarks |
|---|---|---|---|---|---|---|
| | | | In previous years, percent | After spray, percent | Control, percent | |
| Vegetables: | | | | | | |
| Cabbages, 2 acres | Birds pecking, rabbits gnawing in spring | do | [1] 20-30 | 0 | None | 1 spray at heavy attack caused all birds to leave. |
| Cabbages, 2½ acres | do | do | 10-25 | 0 | 20 | 1 spray before attacks. No damage to treated areas. |
| Beans, 1 acre | Damage by birds | do | 10-20 | 2 | 15 | 1 spray before attack, 1 spray at each new growth. |
| Peas, 5 acres | do | 25 g.p.a. powder solution | 10-50 | 1 | 20 | 1 spray at pod formation and after at new growth. |
| Lettuces, ½ acre | Damage by birds and rabbits | 16 g.p.a. powder solution | 10-20 | 0 | 15 | 1 spray at 1st attack and later on new growths. |
| Peas, 5 acres | By birds and rabbits on emergence | 20 g.p.a. powder solution | 10-30 | 2 | 20 | Applied at emergence then at 4 leaf stage. |
| Beans, 3 acres | do | do | 10-25 | Nil | 15 | Sprayed at 2 leaf and 6 leaf stages. |
| Cabbages, 1 acre | Plants eaten by rabbits | 20 g.p.a. to plants M.T. emulsion solution | [2] | Nil | 15 | Plants dipped into emulsion to 1 inch below crown before planting in October/November, 1 spray overall December. |
| Tomatoes, ½ acre under glass | Very early plants and fruit pecked by birds very extensively | 25 g.p.a. powder solution | [3] | Nil | None | All plants sprayed. Birds left immediately returning at about weekly intervals with no further damage. |
| Cereals etc.: | | | | | | |
| Maize, 5 acres | Seed and sprouts picked off by game birds | ½ lb./cwt. powder to seeds | [4] | Nil | 80 | Seed sprayed prior to planting. Control reseeded partially twice. Treated seed all grew. |
| Wheat, 10 acres | Seed and shoots by game birds | ¼ lb. powder per 1 cwt. seeds | [5] | Nil | 50 | Seed sprayed prior to planting, control area re-seeded partially twice. |
| Mixed corn, 5 acres | Autumn sown: eaten by rabbits and birds | 20 g.p.ac. M.T. emulsion solution December | [6] | 0 | 10 | Test unsatisfactory, treated areas in blocks. When animals and birds reached one they left the field. |
| Seed corn, 1½ acres | Spring sown for seed: taken by birds before harvest | 25 g.p.ac. powder solution | [7] | Nil | 50 | Test completely satisfactory, control also sprayed after heavy attack and birds left the area. |
| Fruit trees | Bark of newly planted trees gnawed by rabbits | M.T. emulsion thickly to stems | [5] | Nil | None | All young stock dipped before planting. No controls. No losses although rabbits active nearby. |
| Ash berries, 1 tree | By birds stripping berries in autumn | Powder to one half of tree | 100 | Nil | 100 | Birds stripped untreated half. All treated berries left. |
| Grass | Goats feeding | Powder | 100 | Nil | 100 | Goats would not eat treated grass even when tethered in it. |

[1] Damaged.  [2] To 30%.  [3] To 25%.  [4] 80% in 2-3 resowings.  [5] To 40% in 3 sowings.  [6] To 15%.  [7] To 100%.

TABLE II.—FIELD TESTS, PIGS, FOR CONTROL OF TAIL BITING

In each of the following cases the incidence of tail-biting and sometimes ear-biting had commenced and was steadily increasing. In each case, the repellent was applied from aerosols from a distance of about two feet and the pigs so treated were marked with a paint of one colour. Those bitten but untreated and left as control were marked with paint of another colour. Pigs not bitten were left unmarked.

| Class of pig | Age, weeks | Number per pen | Number bitten | Number treated | Result |
|---|---|---|---|---|---|
| Landrace cross large white fatteners. | 12-14 | 10 | 8 | 4 | Chewing of treated pigs stopped on the day of treatment and did not recur. Chewing of two of the untreated pigs stopped on the second day, and chewing of the remaining two stopped on the third day. During the 16th and 17th weeks chewing re-commenced on two pigs which were immediately sprayed with repellent. No further chewing. |
| Saddlebacks crosses with large white Landrace fattening. | 13 | 14 | 13 | 14 | This was a very serious outbreak of both tail and ear-biting and all pigs were suffering badly and doing very poorly. All pigs sprayed throughly over tails and ears. All biting stopped immediately and did not recur. |
| Large whites | 16 | 10 | 6 | 3 | Bitten pigs doing very badly. Biting was frequent but on treated pigs it stopped immediately without recurring. Biting continuted on three untreated pigs and commenced on one other at the third day after treatment. All pigs treated on seventh day, when all biting stopped. |
| Saddlebacks, various crosses | 14-16 | 12 | 7 | 4 | All biting stopped following treatment. Two treated pigs were bitten again at 18th week but this stopped immediately on further spraying. |
| Mixed crosses | 12-15 | 10 | 10 | 5 | 8 were badly bitten continuously, 2 bitten intermittently which were treated with 3 badly bitten pigs. Biting stopped on the bitten pigs immediately after treatment and did not recur. All untreated pigs sprayed after 2 weeks and all biting stopped. |
| Large white cross Landrace | 8-10 | 12 | Nil | All | Following heavy fighting when pigs from various litters were mixed and brought to the same pen, and as fighting was starting between these pigs all were sprayed immediately they were put into the pen, tails, flanks, and ears. No further fighting. No tail or ear-biting. |

Of a further 12 mixed litters all of which were sprayed immediately upon mixing as they were being penned, fighting occurred only once and tail-biting twice, which was immediately stopped by spraying with the repellent composition.

Note.

In all cases where the composition had been applied to bitten parts, the wounds dried quickly.

TABLE III.—TESTS AGAINST RATS

[1,000 gram lots of barley grain in bags placed amongst selected rat colonies around a field pond and covered with metal sheets]

| | Maximum infestation, percent damage and grain eaten after— | | | | | Moderate-heavy infestation, percent damage and grain eaten after— | | | | |
|---|---|---|---|---|---|---|---|---|---|---|
| | 1 day | 3 days | 4 days | 6 days | 8 days | 1 day | 3 days | 4 days | 6 days | 8 days |
| Untreated control grain and bag | (1) | (2) | | | | (3) | (3) | (4) | 75 | 95 |
| Grain untreated, bag sprayed aerosol | 0 | 0 | 0 | 0 | 5 40 | (3) | (3) | 0 | 0 | 5 5 |
| Grain untreated, bag powdered | 0 | 10 | 30 | (2) | | (3) | (3) | 5 0 | 25 | 80 |
| Grain powdered, bag sprayed with powder solution | 5 0 | 0 | 30 | 80 | 97 | (6) | (6) | 0 | 25 | 50 |
| Grain powdered, bag untreated | 7 0 | 0 | 10 | 66 | 90 | (6) | (6) | 7 0 | 25 | 75 |

(1) 50% ripped.
(2) 100% taken away.
(3) Nil damage as sacks had been placed on galvanized sheets.
(4) 10% chewed.
(5) One hole.
(6) Placed on ground after 3 days.
(7) 3 holes.

EXAMPLE 7.

An animal deterrent powder composition comprises:

| | |
|---|---|
| Aluminum ammonium sulfate (Particle size less than 75 microns) | 86.5% |
| Sodium lauryl sulfate | 0.5% |
| Corn starch | 11% |
| Guar Gum | 1.5% |
| Silica Gel | 0.5% |

EXAMPLE 8.

An animal deterrent powder composition comprises:

| | |
|---|---|
| Aluminum ammonium sulfate | 85.5% |
| Sucrose octa-acetate | 1% |
| Sodium lauryl sulfate | 0.5% |
| Corn starch | 11% |
| Guar Gum | 1.5% |
| Silica Gel | 0.5% |

EXAMPLE 9.

An animal deterrent coating composition is prepared by blending together three components, a powder component containing an animal deterrent compound, a plasticized emulsion of polyvinyl chloride and water in the weight ratio of 7 parts by weight of powder, 2 parts by weight of polyvinyl chloride emulsion and 3 parts by weight of water.

| | |
|---|---|
| Aluminum ammonium sulfate (Particle size less than 75 microns) | 85.5% |
| Sucrose octa-acetate (Particle size less than 75 microns) | 1% |
| Sodium lauryl sulfate | 0.5% |
| Corn starch | 11% |
| Guar Gum | 1.5% |
| Silica Gel | 0.59% |

The polyvinyl chloride emulsion comprises:

| | |
|---|---|
| Polyvinyl Chloride | 55 parts |
| Vinyl Chloride | 0.5 " |
| Dibutyl Phthalate | 20 " |
| Diallyl Ricinoleate | 0.02 " |
| Polyvinyl Alcohol | 2 " |
| Deionized Water | 45 " |

I claim:

1. An animal deterrent composition consisting essentially of a major proportion of an animal deterrent aluminum compound selected from the group consisting of aluminum sulfate, potassium aluminum sulfate and aluminum ammonia sulfate, together with a minor proportion of at least one other deterrent compound selected from the group consisting of sucrose octa-acetate, benzyldiethyl-(2,6-xylylcarbamoyl methyl) ammonium benzoate; 9,10-dioxoanthracene; dimethylphthalate; N-N-diethyl-m-toluamide; butopyrenoxyl; meliantriol; and margosa oil.

2. A composition as claimed in claim 1 in which the animal deterrent compound of aluminum is aluminum ammonium sulfate.

3. An animal deterrent composition containing as animal deterrent component a major proportion of an animal deterrent aluminum compound selected from the group consisting of aluminum sulfate, potassium aluminum sulfate, and aluminum ammonium sulfate, together with a minor proportion of, as an animal deterrent compound, benzyldiethyl-(2,6-xylylcarbamoyl-methyl) ammonium benzoate.

4. A composition according to claim 1 which contains sucrose octa-acetate as an animal deterrent compound.

5. A composition according to claim 1 in which the aluminum compound is finely divided form having a particle size of less than 75 microns.

6. A composition according to claim 5 in which the aluminum compound has a particle size of less than 50 microns.

7. A composition according to claim 1 in which the aluminum compound forms at least 70 percent by weight of the animal deterrent component.

8. A composition according to claim 7 in which the aluminum compound forms at least 90 percent by weight of the animal deterrent component.

9. A composition according to claim 7 in which the other animal deterrent compound or compounds are each present in an amount of up to 2.5 percent by weight based on the weight of the animal deterrent component.

10. A composition according to claim 1 in the form of a powder and containing one or more inert carriers and/or diluents.

11. A composition according to claim 10 containing a wetting agent.

12. A composition according to claim 1 in the form of a paste containing a binding agent, said binding agent being selected from the group consisting of paint lacquer, varnish, and emulsions or solutions of a synthetic organic polymer, said polymer being selected from the group consisting of polyvinyl chloride, polyvinyl acetate, and polyvinyl alcohol.

13. A composition according to claim 1 in the form of a pressurized composition comprising the active ingredients suspended in one or more liquified gaseous propellants.

14. A method of inhibiting animal attacks at a locus which comprises applying to the locus an animal deterrent amount of a composition defined in claim 1.

\* \* \* \* \*